United States Patent

Beyda et al.

[11] Patent Number: 5,935,218
[45] Date of Patent: Aug. 10, 1999

[54] METHOD AND APPARATUS FOR BUS NETWORK PRIORITIZATION USING THE BROADCAST OF DELAY TIME TO LOWER PRIORITY USERS FROM HIGH PRIORITY USERS IN A TOKEN OR LOOP NETWORK

[75] Inventors: William Joseph Beyda, Cupertino; Shmuel Shaffer, Palo Alto; Charles M. White, San Jose, all of Calif.

[73] Assignee: Siemens Information and Communication Networks, Inc., Boca Raton, Fla.

[21] Appl. No.: 08/832,990

[22] Filed: Apr. 4, 1997

[51] Int. Cl.[6] .............................. H04L 12/42; H04Q 9/00; H04J 3/02; H04J 3/26

[52] U.S. Cl. .......................... 709/251; 709/253; 709/224; 709/225; 709/228; 709/232; 709/227; 709/235; 370/455; 370/909; 370/445; 340/825.05; 340/825.5; 707/9

[58] Field of Search ........................ 395/200.33, 200.55, 395/200.48, 200.37, 200.53, 200.59, 200.7, 200.56, 200.83, 200.81, 200.65, 200.78; 707/9; 340/825.05, 825.5; 370/455, 445, 909; 709/224, 225, 227, 228, 235, 232, 251, 253

[56] References Cited

U.S. PATENT DOCUMENTS

| 4,459,588 | 7/1984 | Grow | 340/825.05 |
|---|---|---|---|
| 4,482,999 | 11/1984 | Janson et al. | 370/452 |
| 4,500,987 | 2/1985 | Hasegawa | 370/462 |
| 4,561,092 | 12/1985 | Shaver | 370/448 |
| 4,670,872 | 6/1987 | Cordill | 370/447 |
| 4,680,757 | 7/1987 | Murakami et al. | 370/455 |
| 4,726,018 | 2/1988 | Bux et al. | 370/455 |
| 4,823,122 | 4/1989 | Mann et al. | 340/825.5 |
| 4,942,574 | 7/1990 | Zelle | 340/825.5 |
| 5,115,430 | 5/1992 | Hahne et al. | 370/440 |
| 5,263,163 | 11/1993 | Holt et al. | 340/825.5 |
| 5,371,859 | 12/1994 | Lennartsson | 710/114 |
| 5,383,186 | 1/1995 | Shin et al. | 370/455 |
| 5,390,182 | 2/1995 | Zheng | 370/452 |
| 5,446,735 | 8/1995 | Tobagi et al. | 370/445 |
| 5,553,073 | 9/1996 | Barraclough et al. | 370/455 |
| 5,566,177 | 10/1996 | Bhandari et al. | 395/200.81 |
| 5,581,794 | 12/1996 | Lin et al. | 710/58 |
| 5,651,113 | 7/1997 | Lin et al. | 710/58 |
| 5,682,604 | 10/1997 | Kashi et al. | 370/449 |

Primary Examiner—Frank J. Asta
Assistant Examiner—William D. Thomson

[57] ABSTRACT

A method for dynamically allocating the capacity of a computer network. All users of the network are classified as low or high priority users. High priority users may broadcast a delay message to the low priority users that cause the low priority users to delay before attempting to use the network. The length of delay can be adjusted if the high priority users are not able to utilize the network as required. In addition, if a low priority user does not receive a broadcast delay message within a predetermined amount of time, the delay period is reset to avoid unnecessary slowing of the network.

4 Claims, 4 Drawing Sheets

5,935,218

METHOD AND APPARATUS FOR BUS NETWORK PRIORITIZATION USING THE BROADCAST OF DELAY TIME TO LOWER PRIORITY USERS FROM HIGH PRIORITY USERS IN A TOKEN OR LOOP NETWORK

FIELD OF THE INVENTION

The present invention relates to computer networks in general, and in particular to methods of allocating the resources of a shared data bus.

BACKGROUND OF THE INVENTION

In modern distributed computer systems, a variety of computing resources are interconnected via a shared communication link. Such links typically comprise local or wide area networks on which computers may transfer information or documents between themselves as well as with shared resources such as printers or modems. Most currently utilized network schemes employ a common data bus whereby each user on the network has equal access to the bus at any given time.

One of the most often used protocols for a common bus network is referred to as carrier sense multiple-access/collision-detection (CSMA/CD). One implementation of this standard is called "Ethernet" and was developed by the Xerox Corporation. On an Ethernet network, each user transmits and receives packets of information that contain the identities of the recipient and the sender as well as the data to be transmitted. To send data on the network, each user waits until no activity is seen on the network and begins sending a message packet. While the packet is being transmitted, the user simultaneously checks for collisions, and as long as no collisions occur, continues sending the message packet. If a user detects a collision, the user intentionally jams the network to ensure that all other users see a collision and then wait a random length of time before attempting another transmission.

While equal access network protocols work well for non-priority computing applications such as e-mails or printing, etc., such protocols hinder the ability of computers to run newly developed, high bandwidth applications such as real-time audio and video. In the past, if a user on a network required increased bandwidth, a dedicated communication link had to be installed. These additional links are not cost effective and add to the maintenance needs of the network.

Given the shortcomings of prior art networking schemes, there is a need for a network communication system that can accommodate occasional high bandwidth users on the existing network without requiring additional hardware or cabling.

SUMMARY OF THE INVENTION

The present invention is a method of operating a computer network whereby users of a common data bus are assigned a high priority or low priority status. High priority users can instruct the low priority users to wait a specified amount of time before transmitting data on the common data bus. High priority users are able to use the data bus as soon as it is available. If a high priority user does not have sufficient access to the common data bus, it can instruct the low priority users to increase the amount of time to wait before using the data bus. If a low priority user is not periodically reminded of the increased delay time it must wait before using the data bus, then the low priority user resets the delay time.

To implement the method of the present invention, a network interface for each user of the network is provided a memory that stores a current delay time to be used before accessing the data bus as well as a timer circuit that monitors the length of time since a new delay time has been broadcast to the users of the network. A processor within the network interface reads the current delay time stored in the memory and waits for the time indicated before attempting to transmit data on the common data bus. In addition, the processor keeps track of the time since a delay time was broadcast and resets the delay if the time exceeds a predefined interval.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

As indicated above, the present invention is a method for dynamically allocating the resources of a shared computer network among high and low priority users.

Figure 1A:
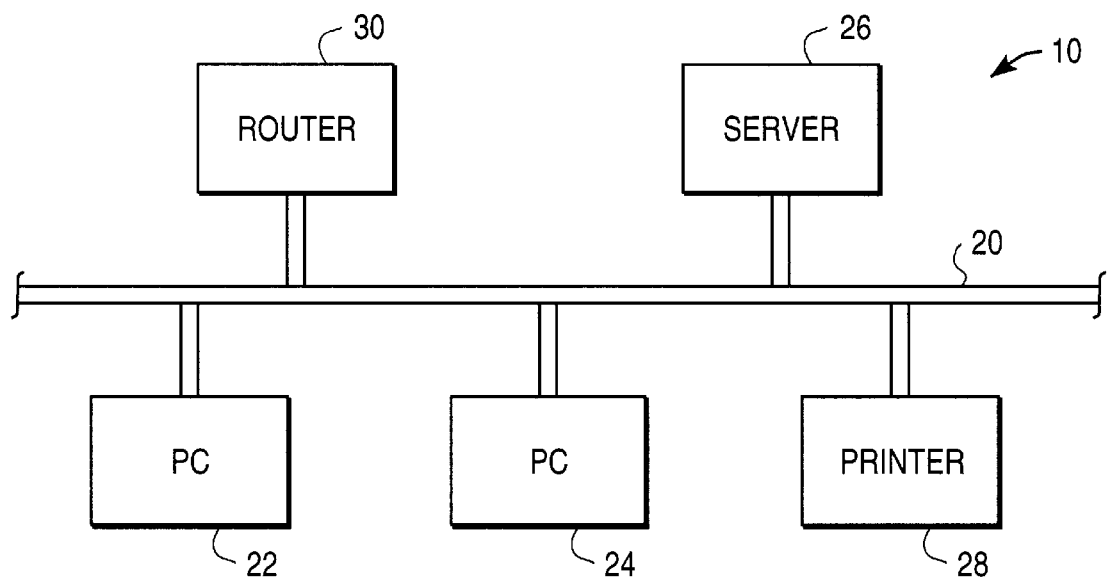
FIGS. 1A and 1B illustrate two common computer network topologies.
Figure 1B:
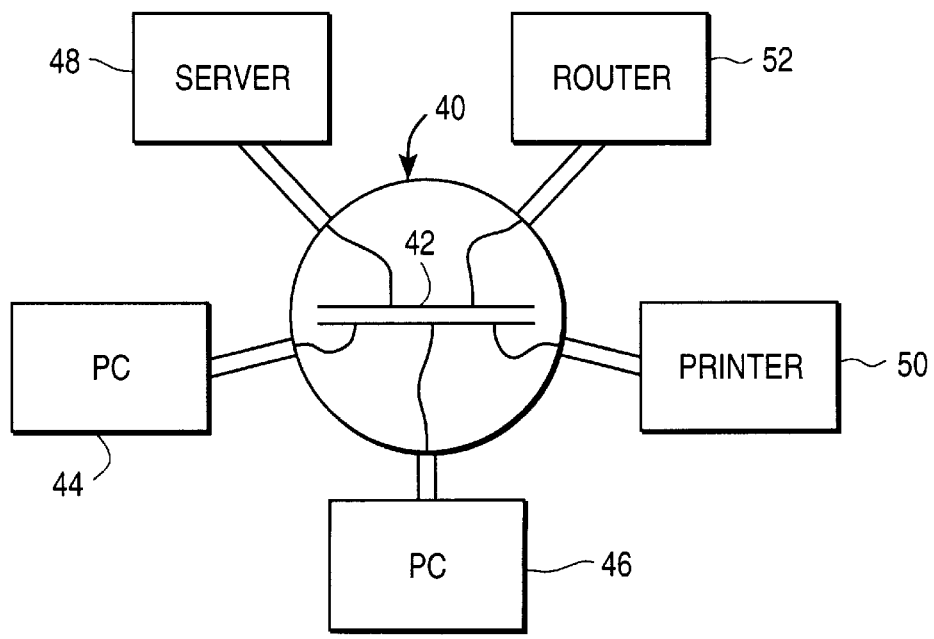

FIGS. 1A and 1B illustrate two common computer network topologies. The network 10, shown in FIG. 1A, comprises a common data bus 20 having a number of users connected to it. These users may be personal computers 22, 24, server computers 26 or shared resources such as a printer or modem 28. Also connected to the data bus 20 is a router computer 30 that transmits and receives data from other computer networks such as the Internet. Data may be transmitted on the data bus 20 between each of these users. The network 10 shown in FIG. 1A is characterized by a relatively long data bus and short connections from each user to the bus.

If the network 10 is Ethernet compatible, each user has an equal right to access the data bus at any given time. However, if all users need to access the data bus at roughly the same time, the bandwidth available to each user rapidly decreases. The network 10, as well as the connections of each user to the data bus, are considered well known to those of ordinary skill in the art, and therefore will not be discussed further except as they relate to the present invention.

The computer network 40 shown in FIG. 1B is arranged as a hub having a relatively short common data bus 42 to which a plurality of users are connected through relatively long connections. Again, the users of the network may include personal computers 44, 46 as well as server computers 48 and shared resources such as printers or modems 50. A router computer 52 couples the network 40 to one or more remotely located hubs or other computer networks such as the Internet.

As indicated above, the problem with current computer networks is that each user has an equal right to access the bus at any given time. To accommodate users requiring a greater share of the network's resources, the present invention divides users into high priority and low priority users. Those users that perform tasks that are non-time-critical, such as printing, mass storage, etc., can be classified as non-priority users while users that operate real-time or time-critical applications can be high priority users. In addition, a user could be a high priority user for some applications and a low priority user for other applications.

As will be explained in further detail below, the present invention operates by broadcasting a variable delay message to each user on the network. Low priority users receive the delay message and wait for a time period equal to the delay before using the network resources. High priority users may use the network as soon as the data bus becomes available. By asking the low priority users to wait before attempting to utilize the common data bus, there is a greater likelihood that high priority users will be able to use the data bus as needed.

Figure 2:
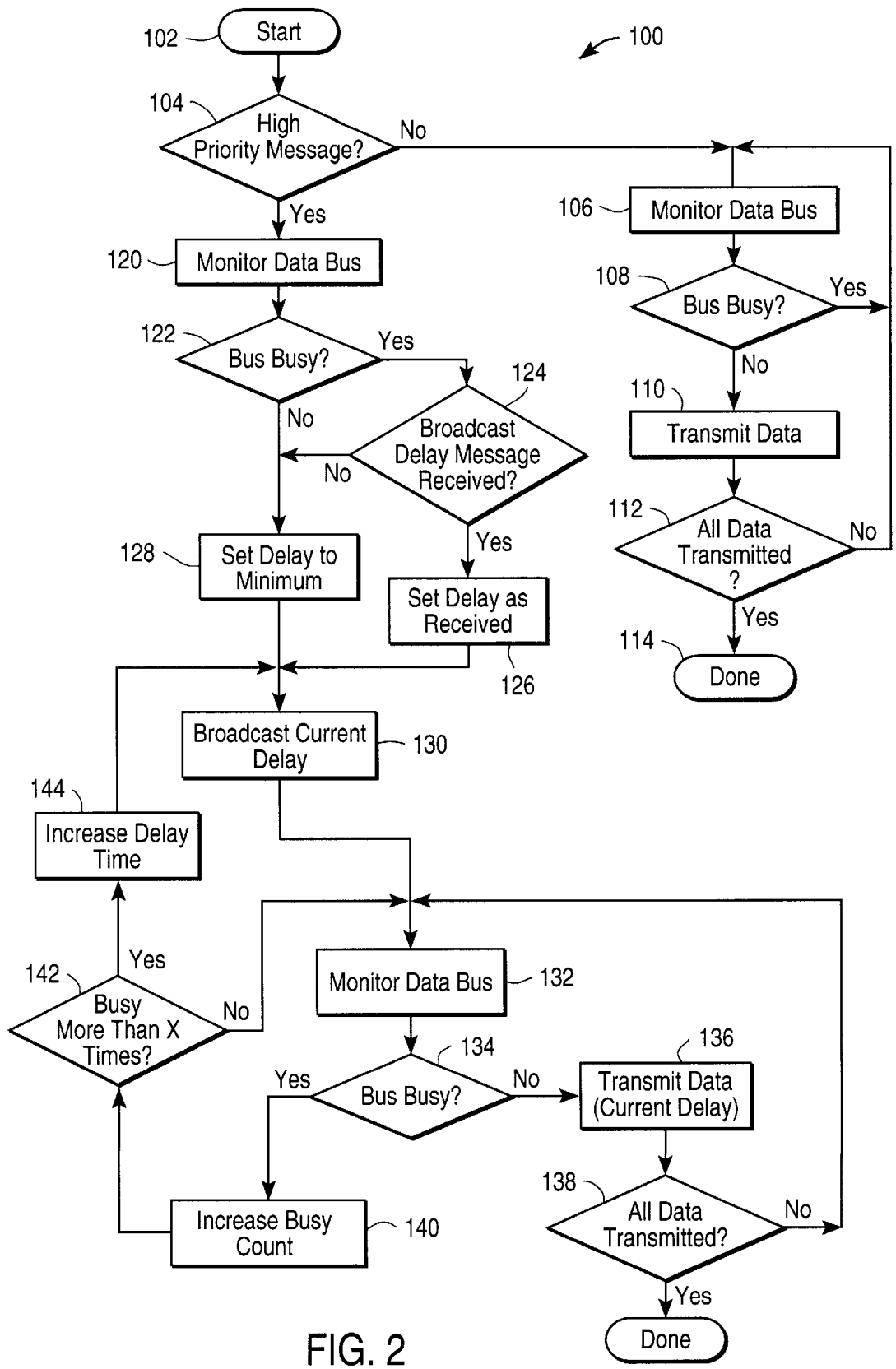
FIG. 2 is a flow chart of the steps performed by a high priority user to implement the bus prioritization method of the present invention.

FIG. 2 is a flow chart showing a sequence of steps 100 taken by a high priority user to utilize a computer network that is operated according to the present invention. Although the steps are shown sequentially for purposes of illustration, those skilled in the art of computer programming will recognize that the functions described could also be implemented in a non-linear programming language such as C++. A high priority user wishing to use the common data bus begins at a step 102 and determines whether a message or data to be transmitted on the network is of high enough priority to warrant the demand of extra network resources at a step 104. If the data to be transmitted is not high priority, the user monitors the data bus at a step 106. At a step 108, the user determines if the data bus is busy. If the data bus is busy, processing returns to step 106 and the data bus is monitored until the data bus is not busy. Once the answer to step 108 is no, the user transmits one or more packets of data on the common data bus at a step 110. After the packets have been transmitted, the user determines if all the data to be transmitted has been transmitted at a step 112. If the answer is no, processing returns to step 106 and the process continues in the method described above. Processing ends at a step 114 once all the data to be transmitted has been transmitted.

If the data to be transmitted is of sufficient priority to warrant the utilization of extra network resources (i.e., the answer to step 104 is yes), then the user monitors the data bus at a step 120. At a step 122, it is determined if the data bus is busy. If the bus is busy, the user determines at a step 124 whether a broadcast message has been received that indicates that another high priority user on the network has set a delay period for utilizing the data bus. If the answer to step 124 is yes, then the high priority user adopts the delay that was broadcast from the other user at a step 126. If the answer to step 124 is no, then the high priority user adopts a minimum delay at a step 128. It should be noted that the adoption of another user's delay time at step 126 may take place even when the user does not wish to use the data bus. Delay messages are broadcast to all the users of the network. If a user receives a broadcast message containing a delay time, then the user immediately adopts the delay time.

After the delay time has been set, the high priority user broadcasts the current delay time to all the other users of the network at a step 130. At a step 132, the high priority user monitors the data bus, and a step 134 determines whether the data bus is busy. If not, the user immediately transmits one or more packets of data at a step 136. In addition to transmitting packets of data, the high priority user may also re-broadcast the current delay time in order to prevent the low priority users from timing out the delay as will be described below. At a step 138, it is determined whether all data to be transmitted has been transmitted. If the answer to step 138 is no, processing returns to step 132 and the steps of monitoring the data bus and transmitting data packets are repeated. Once all the data to be transmitted has been transmitted, processing ends at the step 114.

Assuming the answer to step 134 is yes, meaning that the data bus is busy, then the high priority user increases a busy count at a step 140. At a step 142, it is determined whether the busy count exceeds a predetermined number. For example, the high priority user may check to see if the data bus is busy on 5–10 consecutive attempts. If the answer to step 142 is no, then processing returns to step 132. If the answer to step 142 is yes, then the high priority user assumes that the delay time used by the low priority users of the network is insufficient to guarantee that the high priority user can use the data bus as needed. Therefore, the high priority user increases the current delay time at a step 144. Processing then returns to step 130 where the increased delay time is then broadcast during the next free period on the data bus.

As can be seen from the above description, the high priority users that operate according to the method of the present invention direct the low priority users to wait a predetermined length of time before using the data bus. By dynamically changing the delay time, each high priority user has a greater likelihood of being able to use the data bus when needed.

Figure 3:
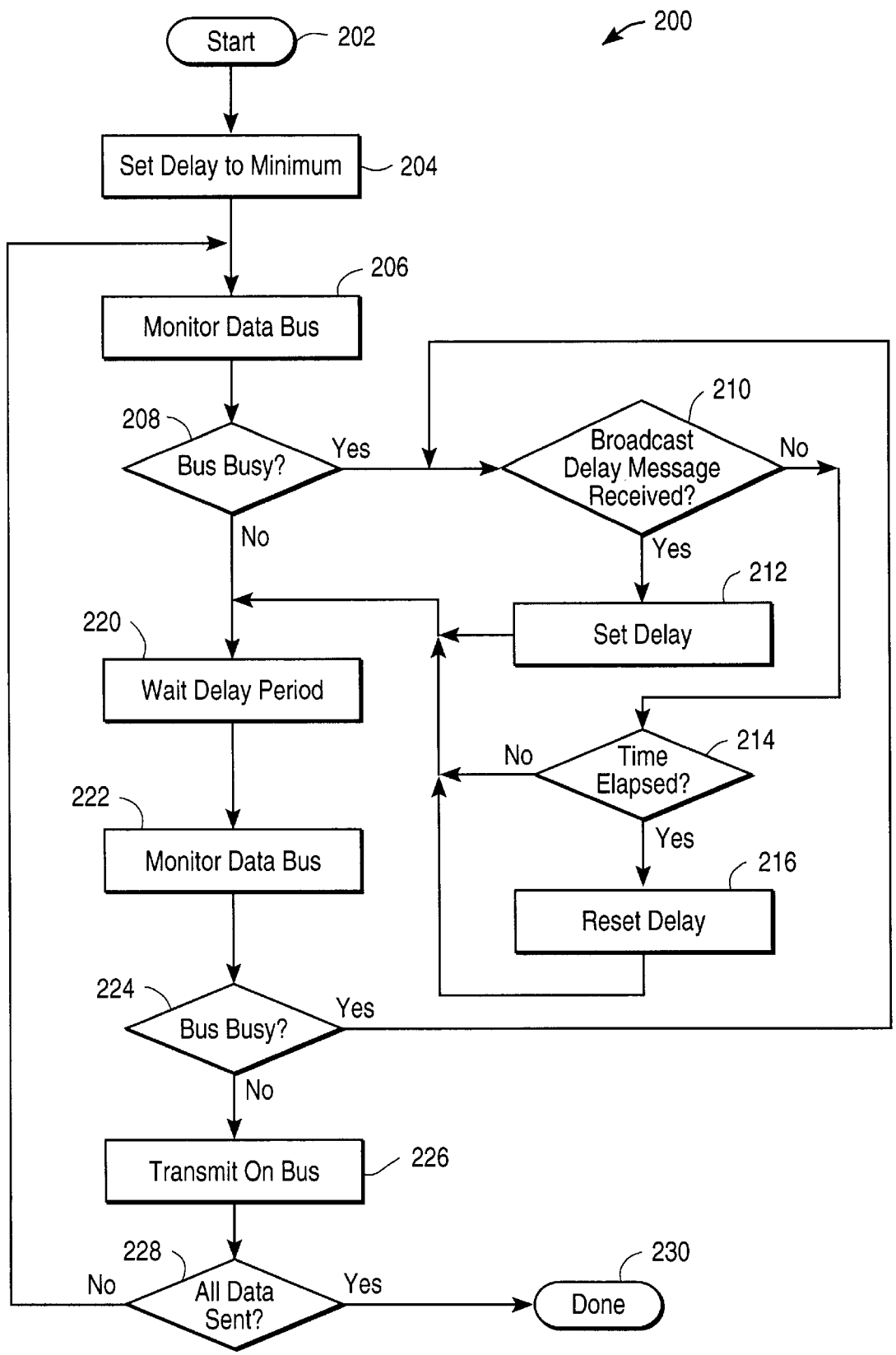
FIG. 3 is a flow chart of the steps taken by a low priority user to implement the bus prioritization method of the present invention.

A sequence of steps 200 performed by a low priority user in order to use the network according to the present invention are shown in FIG. 3. As discussed above, the low priority users are directed to wait a predetermined length of time before accessing the data bus. The length of time for which a low priority user waits is received from the high priority users of the computer network.

Beginning at a step 202, the low priority user initializes its current delay period for the minimum required by the network standard at a step 204. At a step 206, the low priority user monitors the data bus, and determines whether the data bus is busy at a step 208. If the data bus is busy, processing proceeds to a step 210 where it is determined whether a broadcast message containing a delay time has been received. If so, the low priority user sets its current delay to equal the delay time received at a step 212. As will be appreciated by those skilled in the art of computer programming, the adoption of a delay time at a step 212 may take place whenever a delay time message is broadcast from a high priority user. Each low priority user adopts the broadcast delay time regardless of whether they need to use the data bus or not.

If the answer to step 210 is no, i.e., no delay time message was received, then the low priority user determines whether a predetermined length of time has elapsed since the last time a delay message was broadcast. If the answer to a step 214 is yes, then the low priority user resets its delay time to equal the minimum delay required by the network at a step 216. Following step 212 or step 216 or if the answer to step 214 was no, processing proceeds to a step 220 whereby the low priority user waits a period of time equal to the current delay time of the network. At a step 224, the low priority user determines whether the data bus is still busy. If so, processing returns to step 210 whereby it is determined whether a broadcast delay message has been received.

If the data bus is not busy at the step 224, the low priority user transmits one or more data packets on the data bus at a step 226. At a step 228, it is determined whether all data to be transmitted has been transmitted. If all the data has not been transmitted, processing returns to step 206 and the cycle repeats. Once all the data has been transmitted, processing ends at step 230.

Figure 4:
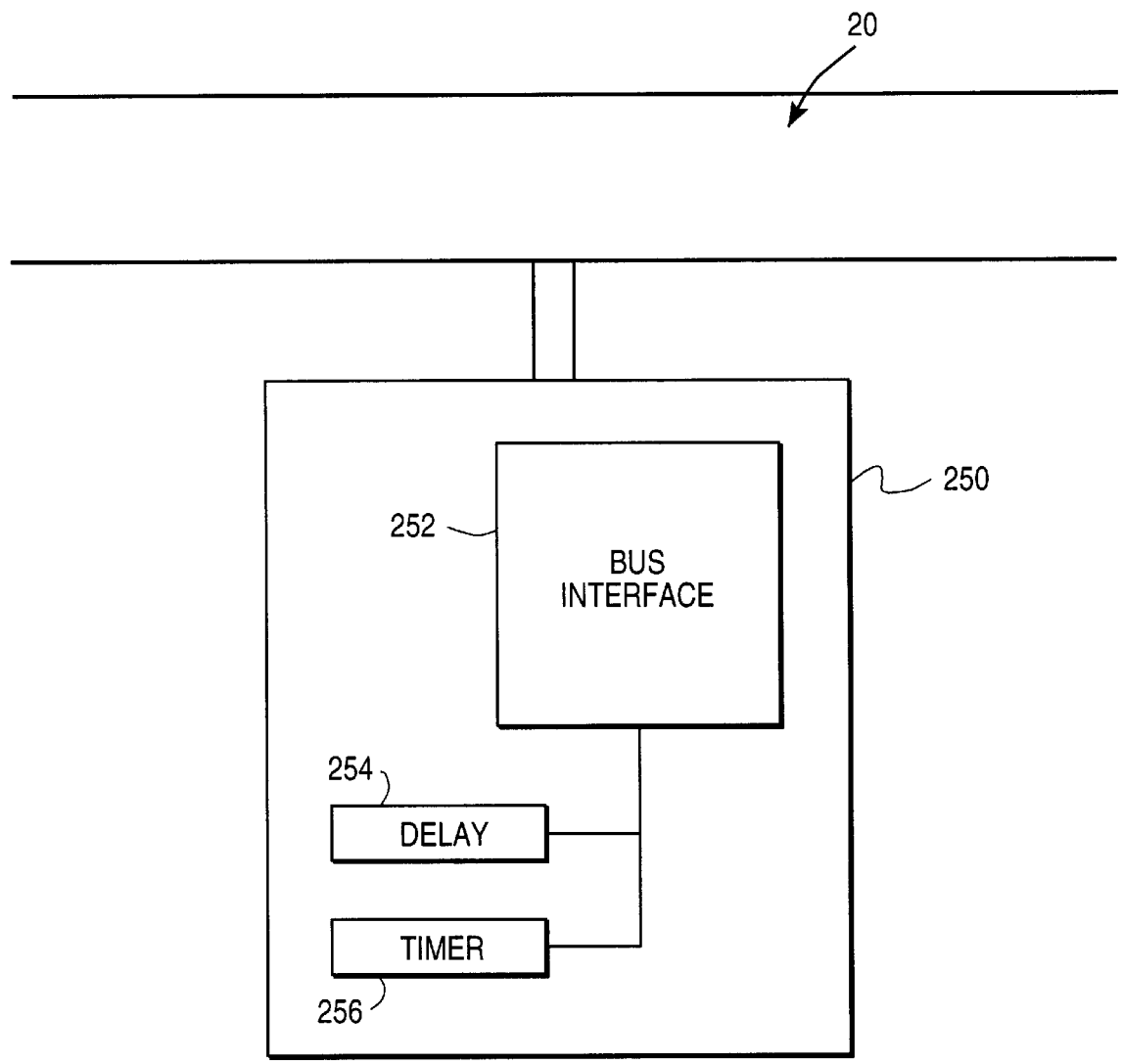
FIG. 4 is a block diagram of a network interface used to connect the high and low priority users to a network that operates according to the present invention.

FIG. 4 illustrates a block diagram of a network interface 250, that couples each of the users of the network to the common data bus. The network interface 250, comprises a conventional bus interface transmit/receive circuit 252 having an internal processor that operates to transmit and receive data signals from the common data bus 20. The design of the bus interface transmit/receive circuit 252 is considered to be well known to those of ordinary skill in the computer communication arts. The internal processor stores an indication of whether the user with which it is associated is a high or low priority user The bus interface transmit/receive circuit 252 has associated with it a memory location 254 in which the current delay time of the network is stored as indicated above. The processor in the bus interface transmit/receive circuit for the low priority users waits for a period of time stored in the memory location 254 before attempting to access the data bus. In addition, the bus interface transmit/receive circuit 252 includes a timer circuit 256 that measures the length of time since a last broadcast delay message was received. As indicated above, the low priority users will reset the current delay time if a broadcast message containing a delay time is not received periodically. This reset procedure prevents the network from being artificially slowed when a high priority user requests an increased delay time and does not subsequently reduce the delay time.

As can be seen from the above description, the present invention is a simple modification to an existing computer network that ensures that high priority users can utilize as much of the network's resources as required. The present invention is easily implemented as a software change in the network interface cards and no additional hardware is required.

Although one embodiment of the present invention has been disclosed with respect to CSMA/CD type networks, the present invention can also be used in token ring/collision avoidance type networks. In a token ring network, users are only allowed to utilize the network resources when they receive a "free token." After using the network, a user passes the free token around the ring for another user to grab if they need to use the network. Each user is only allowed to transmit a predefined number of data packets before it must offer the free token to the other users. In order to implement the present invention in this type of network, a high priority user broadcasts a delay message to the low priority users. The low priority users then delay looking for the token ring for a time equal to the delay time. Therefore, a high priority user may be able to grab the free token several times in succession, while the low priority users are waiting the delay time. In token rings that are not equipped with broadcast message capability, a high priority user transmits a delay time to a router or other message-forwarding computer on the network. The router computer then forwards the delay time using separate messages that are individually addressed to each low priority user.

The embodiments of the invention in which an exclusive property or privilege is claimed are defined as follows:

1. A method of controlling the transmission of data between user devices of a computer network of the type having a shared data path, comprising:

connecting the user devices in the network, which is a token-ring or loop type network, using an unarbitrated bus for transmission of packets between the user devices;

designating the user devices as high priority or low priority devices;

broadcasting a delay time packet directly from a high priority device to at least the low priority devices when the high priority device needs access to the bus; and receiving the delay time packet transmitted from the high priority device at each of the low priority devices, which then wait for the delay time corresponding to the delay time packet before attempting to transmit data on the bus.

2. The method of claim 1, wherein the high priority devices receive the broadcast delay time packets and broadcasts an increased delay time packet, corresponding to an increased desired delay time, if the high priority device cannot transmit data on the bus as desired.

3. The method of claim 1, further comprising periodically broadcasting the delay time packet to the low priority devices.

4. The method of claim 3, further comprising:

monitoring a length of time since a last delay time packet was broadcast at each of the low priority devices; and resetting the delay time if the time since the broadcast of the last delay time packet exceeds a predetermined time interval.

\* \* \* \* \*